Aug. 25, 1953    F. L. ANDERSON ET AL    2,649,665
TIRE TRUING DEVICE
Filed Aug. 14, 1952
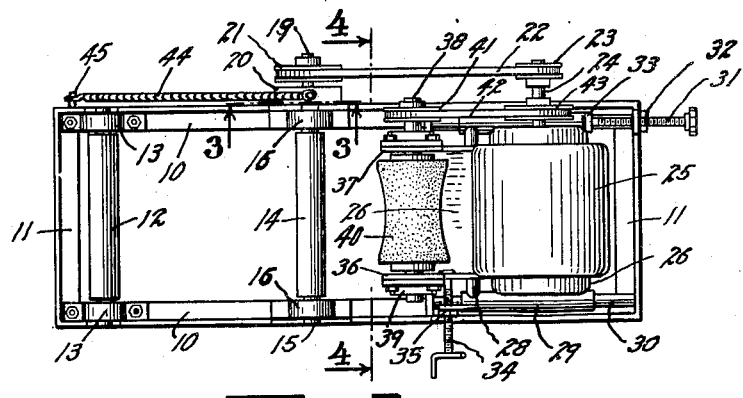
Fig. 1
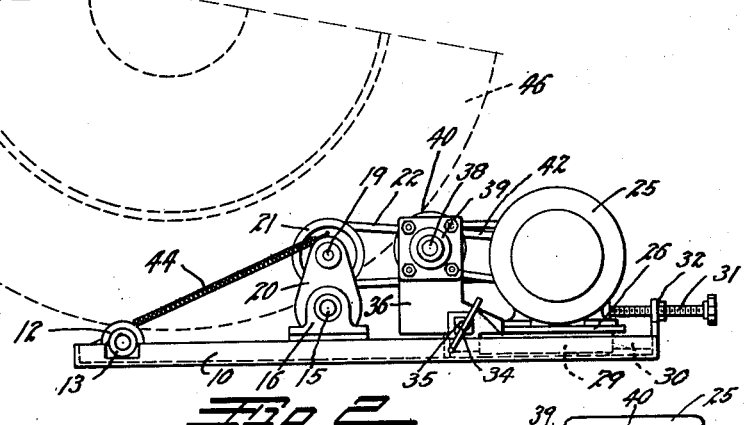
Fig. 2
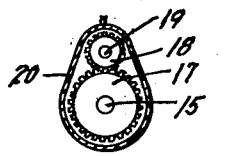
Fig. 3
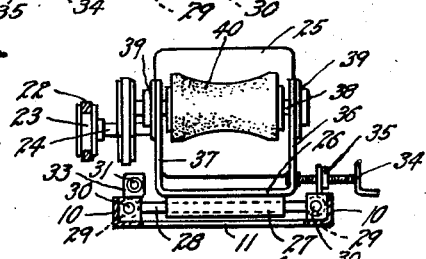
Fig. 4
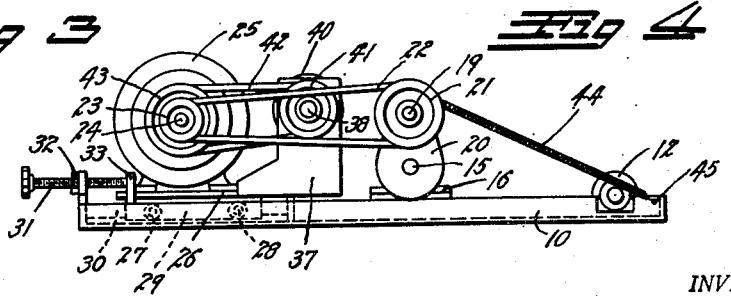
Fig. 5
INVENTORS
FARREL L. ANDERSON
BY GLENN BOWERS
ATTORNEY Patented Aug. 25, 1953

2,649,665

UNITED STATES PATENT OFFICE 2,649,665

TIRE TRUING DEVICE

Farrel L. Anderson and Glenn Bowers,
Bird City, Kans.

Application August 14, 1952, Serial No. 304,298

4 Claims. (Cl. 51—104)

This invention relates to an automotive wheel truing device, and has for its principal object the provision of an economical, portable and highly efficient mechanism which can be placed beneath the wheel of a vehicle, while the latter is in place on the vehicle, and which will act to rapidly and accurately remove all high spots or bumps from the tire tread to bring the riding surface of the tire tread to a perfect smooth concentric condition, and to bring the wheel into a balanced condition.

Another object of the invention is to so construct the device that it may be easily and accurately adjusted to remove the proper amount of material from the tire tread and to accurately center the tread on the tire.

Other objects and advantages reside in the detail construction of the invention, which is designed for simplicity, and economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved tire truing device;

Fig. 2 is a left side view thereof, illustrating the position of a conventional vehicle wheel in broken line;

Fig. 3 is a detail section through a gear box employed on the improved tire truing device taken on the line 3—3, Fig. 1;

Fig. 4 is a cross section taken on the line 4—4, Fig. 1; and

Fig. 5 is a right side view of the truing device.

The improved tire truing device is mounted on an open, rectangular base frame consisting of two longitudinal frame members 10, held in spaced relation by means of cross frame members 11. A transversely-extending idler roller 12 is supported in suitable bearings 13 mounted on the frame members 10. The idler roller 12 is positioned transversely of the frame and adjacent one extremity thereof. A drive roller 14 is fixedly mounted on a roller shaft 15 positioned intermediate the length of the frame 10 and parallel to the idler roller 12 in suitable shaft bearings 16.

A drive gear 17 is mounted on the roller shaft 15 and meshes with a toothed drive pinion 18 mounted on a gear shaft 19. The gear 17 and the pinion 18 are mounted in a gear housing 20 which is hingedly mounted on the extremity of the roller shaft 15. The gear shaft 19 extends outwardly from the housing 20 adjacent the upper extremity thereof. A belt pulley 21 is mounted on the shaft 19 and is driven by means of a transmission belt (preferably a V-belt) 22. The belt 22 is trained round a drive belt pulley 23 on a motor shaft 24 extending from an electric drive motor 25.

The drive motor 25 is mounted on a carriage plate 26. Two parallel, transversely extending, guide tubes 27 are welded or otherwise secured on the bottom of the plate 26. These tubes are slidably mounted on transversely extending guide rods 28. The guide rods 28 are attached at their extremities to sliding sleeves 29. The sleeves 29 are slidably mounted on parallel, longitudinally-extending guide rods 30.

Thus, it can be seen that the carriage plate 26 can be transversely moved on the cross rods 28 and that it can be longitudinally moved on the guide rods 30. The longitudinal movement of the carriage plate is accomplished by means of an adjusting screw 31 which is threaded through a threaded nut 32 supported from one of the cross frame members 11 and terminating in an ear 33 formed on one of the sliding guide sleeves 29. Transverse movement of the carriage plate is accomplished by means of a jack screw 34 threaded through a nut 35, fixedly supported from the other sliding sleeve 29.

The extremity of the jack screw 34 is rotatably mounted in an upturned side flange 36 on the carriage plate 26. A similar side flange 37 is turned upwardly on the opposite side of the carriage plate. The side flanges 34 and 35 support a horizontal grinder shaft 38 in suitable bearings 39. A concave abrasive roller 40 is mounted on the grinder shaft 38. The roller 40 may be formed from "carborundum" or other abrasive material or may be formed of any desired material covered with abrasive material.

The grinder shaft 38 extends outwardly beyond one of the bearings 39 terminating in a driven pulley 41 which is driven by means of a second drive belt 42, from a second drive pulley 43 on the motor shaft 24. A tension spring 44 extends from the gear housing 20 to an attachment pin 45 on one side frame member 10 to constantly urge the gear shaft 19 away from the motor shaft 24 to maintain the drive belt 22 taut.

In use, the wheel to be trued, indicated at 46, is driven onto the rollers 12 and 14. The motor 25 is then started so as to cause the drive roller 14 to simultaneously rotate the wheel 46 and the abrasive roller 40. The jack screw 34 is then adjusted to align the abrasive roller 40 with the medial plane of the wheel 46. The adjusting screw 31 is then rotated to force the abrasive roller 40 toward the wheel 46 until all of the high portions of the tire tread have been abraded away by the rapidly rotating abrasive roller. When the motor moves toward the drive roller 14 the gear housing will swing with the motor to always maintain the proper tension in the drive belt 22.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A tire truing device for automotive wheels comprising: a base frame; an idler roller rotatably supported from said frame and extending transversely adjacent one extremity of the latter; a drive roller rotatably supported by said base frame in parallel spaced relation to said idler roller, said rollers being adapted to support a vehicle wheel therebetween; an abrasive roller supported from said parallel frame to said first rollers; a motor; means for driving said abrasive roller from said motor; a carriage plate upon which said motor is mounted; transversely extending, tubular supporting member on said carriage plate; transversely extending guide members supported from said frame and passing through said tubular members, said tubular members being slidable on said guide members whereby said motor may be adjusted laterally; and means for moving said carriage plate longitudinally.

2. A tire truing device as described in claim 1 having elongated sleeves secured to the extremities of said guide members at right angles to the latter; guide bars supported from said frame and extending through said sleeves; and means for moving said sleeves longitudinally of said frame for adjusting the longitudinal position of said carriage plate.

3. A tire truing device as described in claim 2 having means for rotatably supporting said abrasive roller from said carriage plate; an adjusting screw for changing the longitudinal position of said carriage plate; and a second adjusting screw for adjusting the transverse position of said carriage plate.

4. A tire truing device as described in claim 3 having a drive shaft extending oppositely outward from the extremities of said drive roller; a gear mounted on said drive shaft; a toothed pinion in mesh with said gear; a gear shaft extending from said toothed pinion; a gear housing surrounding said gear and pinion and rotatably mounted on said drive shaft; a pulley carried by said gear shaft; a belt transmitting power from said motor to said gear shaft; and means urging said gear shaft away from said motor shaft.

FARREL L. ANDERSON.
GLENN BOWERS.

References Cited in the file of this patent
UNITED STATES PATENTS

| Number | Name | Date |
| --- | --- | --- |
| 421,377 | Barr | Feb. 18, 1890 |
| 2,215,403 | McGowan | Sept. 17, 1940 |
| 2,546,225 | Julian et al. | Mar. 27, 1951 |